US006421346B1

United States Patent
Itoh et al.

(10) Patent No.: US 6,421,346 B1
(45) Date of Patent: Jul. 16, 2002

(54) ASYNCHRONOUS TRANSFER MODE SWITCH WHICH ACCOMMODATES PLURALITY OF PROTOCOLS AND INTERWORKING CONTROL METHOD

(75) Inventors: Jun Itoh, Yokohama; Masaaki Kato, Kawasaki, both of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/081,366

(22) Filed: May 19, 1998

(30) Foreign Application Priority Data

Jul. 14, 1997 (JP) .............................. 9-188781

(51) Int. Cl.⁷ ............................. H04L 12/28; H04J 3/16
(52) U.S. Cl. ..................... 370/395.7; 370/410; 370/465
(58) Field of Search ................................ 370/395–399, 370/466, 467, 218, 242, 252, 241.1, 395.1, 395.2, 395.7, 410, 419, 465

(56) References Cited

U.S. PATENT DOCUMENTS

| | | | | |
|---|---|---|---|---|
| 5,528,590 A | * | 6/1996 | Iidaka et al. ................. | 370/395 |
| 5,867,481 A | * | 2/1999 | Miyada ....................... | 370/392 |
| 5,933,425 A | * | 8/1999 | Iwata .......................... | 370/252 |
| 6,009,097 A | * | 12/1999 | Han ............................ | 370/395 |

FOREIGN PATENT DOCUMENTS

JP        7-202906        8/1995

* cited by examiner

Primary Examiner—Chau Nguyen
Assistant Examiner—Chi ho A. Lee
(74) Attorney, Agent, or Firm—Katten Muchin Zavis Rosenman (57) ABSTRACT

The present invention provides an ATM switch which includes: memory for storing identification information which identifies user-network interfaces with terminals, analysis control data for analyzing a call control signal for each user-network interface, and editing control data for editing a call control signal for each user-network interface; analysis circuit for analyzing a first call control signal in accordance with the analysis control data corresponding to a first user-network interface identified on the basis of the identification information when the first call control signal is received from a first terminal for setup with a second terminal; call control circuit for performing call control based on the first call control signal analyzed by the analysis circuit; and editing circuit for editing the first call control signal to a second call control signal in accordance with the editing control data corresponding to a second user-network interface identified on the basis of the identification information. Preferably, ATM switch further includes interworking control circuit for controlling call process when an error is detected while the second call control signal is being edited.

20 Claims, 12 Drawing Sheets

- IE ACTION INDICATOR (OCTET 2)

BITS
3 2 1

0 0 0  CLEAR CALL
0 0 1  DISCARD INFORMATION ELEMENT AND PROCEED
0 1 0  DISCARD INFORMATION ELEMENT, PROCEED, AND REPORT STATUS
1 0 1  DISCARD MESSAGE, AND IGNORE
1 1 0  DISCARD MESSAGE, AND REPORT STATUS

ASYNCHRONOUS TRANSFER MODE SWITCH WHICH ACCOMMODATES PLURALITY OF PROTOCOLS AND INTERWORKING CONTROL METHOD

BACKGROUND OF THE INVENTION

1. Field of the Invention

The present invention relates to an asynchronous transfer mode (ATM) switch, and more particularly to an ATM switch capable of performing the call processing and control operations corresponding to the plurality of user-network interfaces (UNI) between user terminals and ATM switches provided by a plurality of recommendation organizations.

2. Description of the Related Art

Figure 10:
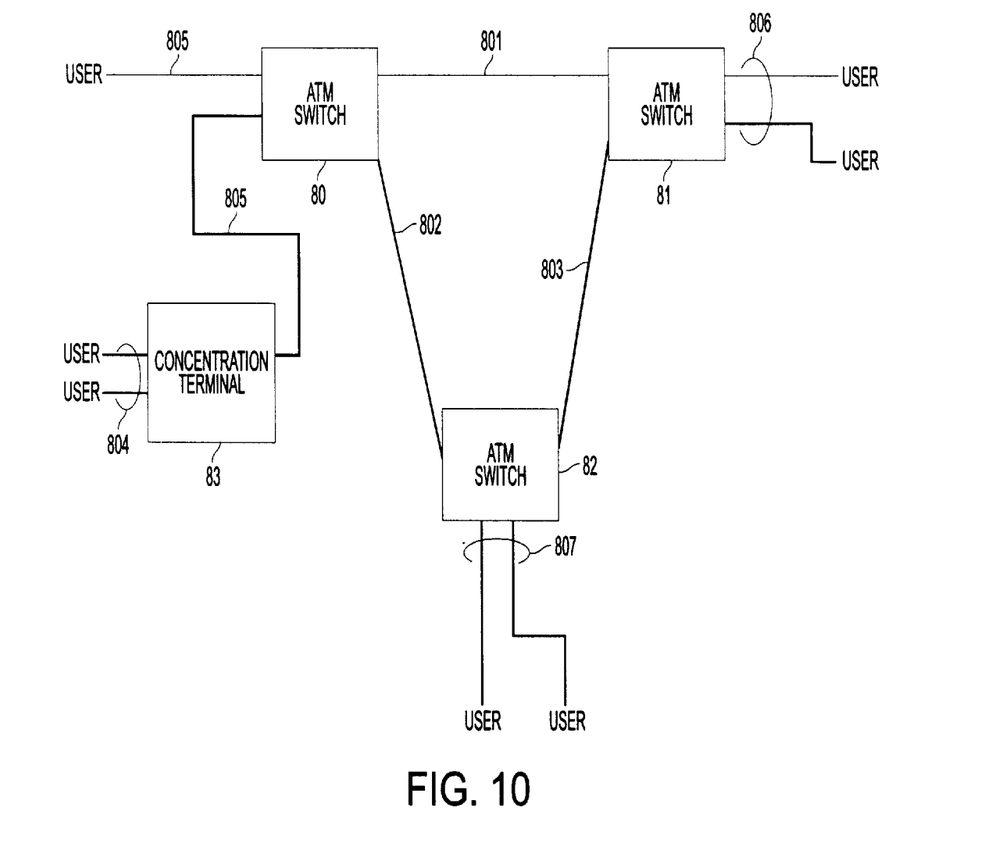
FIG. 10 is an example of an arrangement of B-ISDN system.

ATM switches are scheduled to be utilized in broadband integrated services digital networks (B-ISDN) and other next-generation communications networks. FIG. 10 is an example of an arrangement of B-ISDN system. In FIG. 10, ATM switches 80, 81 and 82 are interconnected by high-speed transmission channels, for example, optical fiber transmission channels 801, 802 and 803, and the ATM switches are connected to users via user lines 804, 805, 806 and 807, either directly, or through a user switch 83, which is an concentration terminal.

Figure 11:
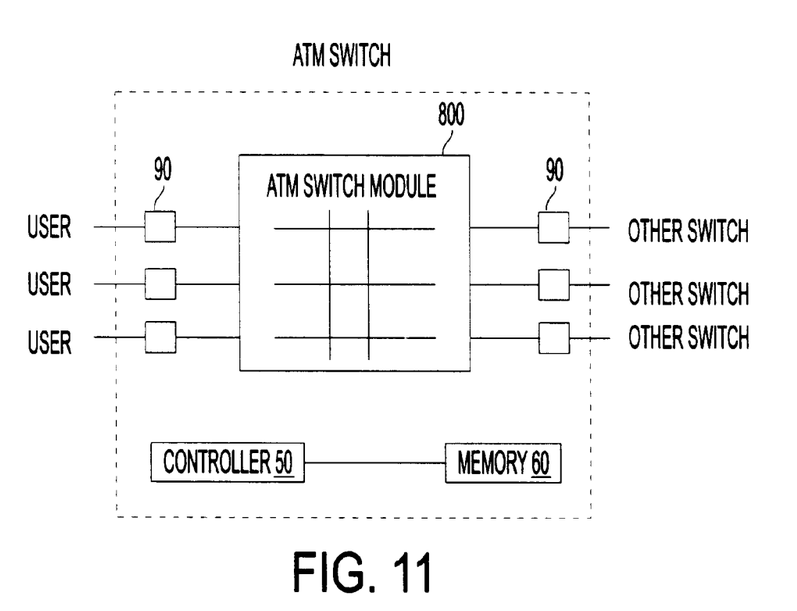
FIG. 11 is a diagram of an ATM switch.

FIG. 11 is a block diagram of an ATM switch. An ATM switch module 800 is connected to the user or user switch via a line interface device 90. The ATM switch module 800 performs hardware switching of an inputted cell based on the header information in that cell, and routes the cell to the line interface device 90 to which it is addressed. The ATM switch also comprises a controller 50, which performs call processing control, i.e. processes and controls the flow of cells and the setting up of calls between users in the ATM switch module and line interface devices, and memory 60, which stores control data for carrying out these control operations. Furthermore, the controller 50 in the diagram is connected to the ATM switch module 800 and line interface devices 90 via wires not shown in the diagram.

Figure 12:
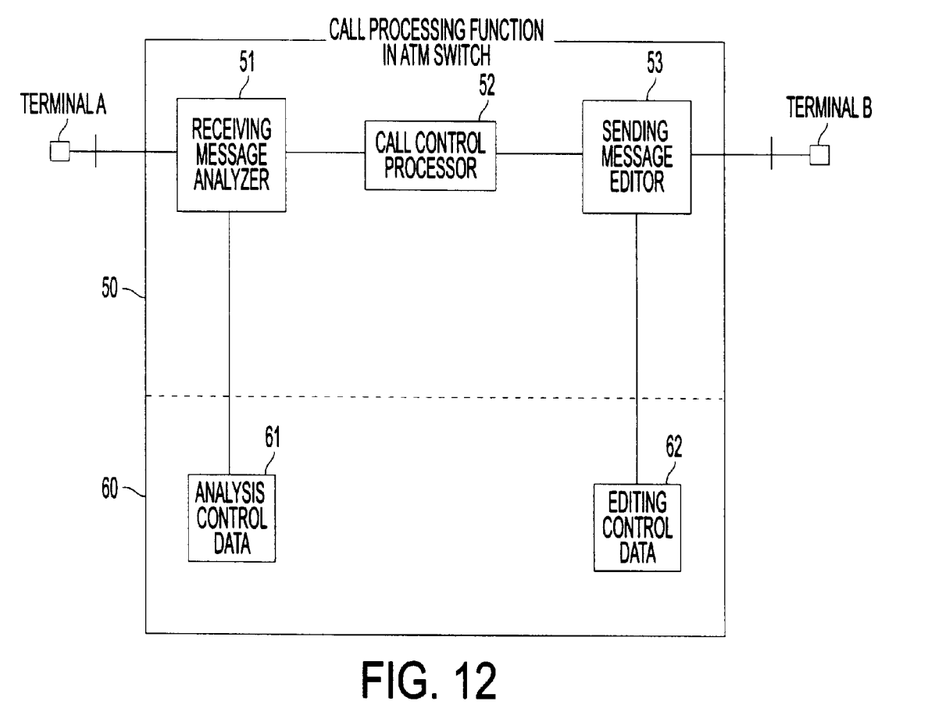
FIG. 12 is a block diagram of the call processing functions performed by controller of the ATM switch.

FIG. 12 depicts in the form of a control block the call processing functions performed by the above-described controller 50 of the ATM switch 10. According to FIG. 12, for example, when a request is made to set up a connection from Terminal A to Terminal B, the ATM switch receives a call processing control signal (message) from Terminal A.

Then, the receiving message analyzer 51 calls up the prescribed analysis control data 61 from memory 60, and based on that data, analyzes the receiving message, i.e. determines whether or not the message can be received, and translates the message, among other processes.

Accordingly, based on the results of this analysis, call processing, such as acquisition of connection bandwidth (the establishment of a virtual path (VP) and virtual channel (VC)) and generation of charging information, is carried out in the call control processor 52. In addition, the sending message editor 53, on the basis of editing control data 62, edits the message to User B, with whom a connection is being established, and sends that message to Terminal B.

There are cases when the protocols of the UNI between Terminal A and the ATM switch, and the UNI between Terminal B and the ATM switch differ at this time. UNI stands for user-network interface (UNI), the interface between terminals and ATM switches in an ATM network. This difference in UNI protocols stems from the fact that there are a plurality of organizations recommending these ATM network UNI (for example, the telecommunications standards division of the International Telecommunications Union (ITU-T)), and since each of these organizations have different service objectives, each organization provides UNI that establish various original protocols.

When inter-user UNI are all different like this because each UNI is defined by the original protocols recommended by the various organizations, in a switched virtual channel (SVC) service, whereby users are connected to one another each time there is a call setup request, there is a risk of various trouble occurring, such as the inability to make connections between users with different UNI, or the need for users to invest additional funds to purchase new equipment for constructing networks with users with different UNI protocols. Further, there is also the risk that a connection setup request between differing UNI will be treated as an abnormal request, thereby adversely affecting the network system by generating failure and congestion.

In addition, the UNI protocols provided by each organization are periodically revised following their publication, and based on individual requests from users, separate UNI protocols are also provided. Therefore, since the practicalization of ATM networks is being pushed forward on the basis of a plurality of already-publicized recommendations, ATM switches must be controlled in accordance with a plurality of UNI protocols recommended by a plurality of recommendation organizations. That is, interworking control is required between different UNI.

SUMMARY OF THE INVENTION

Therefore, an object of the present invention is to provide an ATM switch capable of interworking between different UNIs in an ATM network.

The configuration of the present invention for achieving the above-stated object is an ATM switch, characterized in that it comprises memory for storing identification information which identifies user-network interfaces with terminals, analysis control data for analyzing a call control signal for each user-network interface, and editing control data for editing a call control signal for each user-network interface; analysis means for analyzing a first call control signal in accordance with the analysis control data corresponding to a first user-network interface identified on the basis of the identification information when the first call control signal is received from a first terminal for setup with a second terminal; call control means for performing call control based on the first call control signal analyzed by the analysis means; and editing means for editing the first call control signal to a second call control signal in accordance with the editing control data corresponding to a second user-network interface identified on the basis of the identification information.

Preferably, the memory stores interworking control data for controlling call process when an error is detected while the second call control signal is being edited based on the editing control data; and the ATM switch further comprises an interworking control means for controlling the call process based on the interworking control data when the error is detected.

For example, the first and second call control signals have a plurality of information elements, and when an information element essential during editing of the second call control signal is not included in the first call control signal, the interworking control means perform call clear.

For example, the first and second call control signals contain a plurality of information elements, and when an information element optional during editing of the second call control signal is not included in the first call control signal, the interworking control means controls to continue to edit to the second call control signal. preferably, the interworking control data can be customized.

DESCRIPTION OF THE PREFERRED EMBODIMENTS

Embodiments of the present invention are explained below. However, the technological scope of the present invention is not limited to these embodiments.

Figure 1:
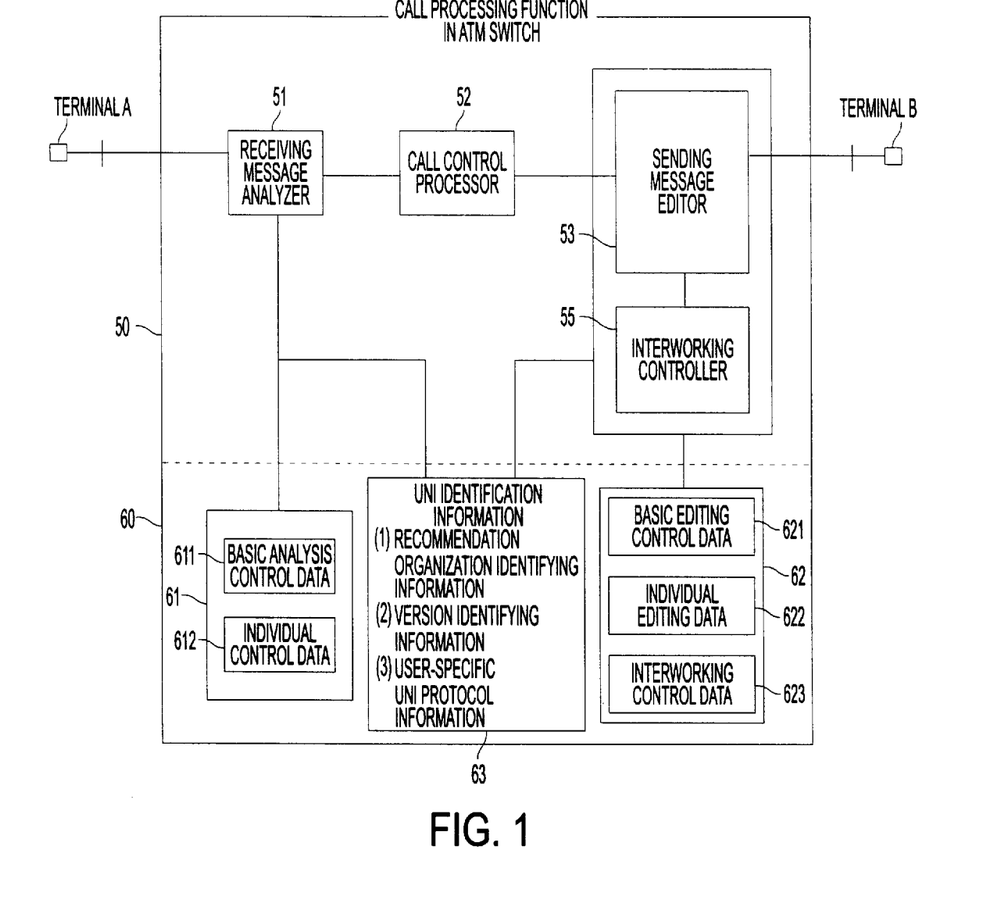
FIG. 1 is a control block diagram of call processing carried out by controller in ATM switch in an embodiment of the present invention.

FIG. 1 depicts a control block diagram of call processing carried out by a controller 50 in an ATM switch in an embodiment of the present invention. In this embodiment, the ATM switch identifies a plurality of UNI, and performs call processing in accordance with these UNI. More specifically, when a message is received from User A's terminal (hereafter referred to as Terminal A), an receiving message analyzer 51 identifies the Terminal A UNI and analyzes the message in accordance with this UNI.

The message comprises a plurality of information elements required to carry out this processing. Accordingly, each message has two types of information elements: mandatory information elements that are absolutely required, and optional information elements, which are included as needed. Examples of information elements, include, for example, "bearer capabilities," "channel identification" and "called party number."

Furthermore, a call control processor 52 performs call processing based on analysis results, and an sending message editor 53 identifies the UNI of User B's terminal (hereafter referred to as Terminal B) to which a connection will be established, and performs message editing to Terminal B in accordance with this UNI.

When the Terminal A UNI and Terminal B UNI differ at this time, the message to Terminal B cannot be edited on the basis of the message from Terminal A. Therefore, the ATM switch controller 50 in this embodiment of the present invention, as is described in detail later on, is equipped with an interworking controller 55 for performing call control under these circumstances.

Thus, the ATM switch has in its memory 60 UNI identification information 63, which identifies the UNI of each terminal for controlling each user terminal UNI as described above, and analysis control data 61 and editing control data 62, which is provided for each UNI.

By way of a more detailed explanation, UNI identification information 63 is information that identifies all the UNI for each terminal in an ATM network. More specifically, it comprises (1) information that identifies a plurality of recommendation organizations, (2) information that identifies the version of the UNI provided by these recommendation organizations, and (3) user-specific UNI protocol information.

Further, analysis control data 61 comprises basic analysis control data 611 and individual control data 612. Basic analysis control data 611 is data for translating the contents of a message from a terminal, and for determining the correctness of those contents, and various such data is provided by each recommendation organization and in each version of their respective UNI. Therefore, there are as many basic analysis control data 611 as there are recommended UNI protocols. In addition, individual control data 612 is data for handling each terminal-specific UNI protocol, and is provided by each of the recommendation organizations. Therefore, there are also as many individual control data 612 as there Are terminals that have individual protocols.

Thus, when a message is received from Terminal A, the receiving message analyzer 51 reads that terminal UNI-a from the UNI identification information 63. Then, the receiving message analyzer 51 selects a basic analysis control data 611a that corresponds to this UNI-a, and implements message analysis processing in accordance with this basic analysis control data 611a. When the fact that this UNI-a is this user-specific UNI protocol is read out from the UNI identification information 63 at this time, further analysis is carried out in accordance with the individual control data 612a.

Further, editing control data 62 comprises basic editing control data 621, individual editing data 622 and interworking control data 623. Basic editing control data 621 is data for editing to a message for sending a message via the call control processor 52 to Terminal B to which a connection will be established. Then, similar to basic analysis control data 611, this basic editing control data 621 is provided to all the user UNI's of the ATM network. Further, individual editing data 622 is also provided for all terminals that have individual protocols.

Further, interworking control data 623 is control data for performing call processing between different UNI in an interworking controller 55. This is explained in detail below.

In an ATM switch such as this, for example, when a call processing control signal (message) is output to request the establishment of a connection from User A to User B, the ATM switch analyzes the message from Terminal A in the receiving message analyzer 51. The first thing the receiving message analyzer 51 does at this time is read out the UNI-a between Terminal A and the ATM switch from the UNI identification information.

Then, basic analysis control data 611 corresponding to this UNI-a is selected, and if Terminal A user protocol information is included in the UNI identification information, corresponding individual control data 612 is selected, and the message is analyzed on the basis of these data.

The analyzed message is sent via the call control processor 52 to the sending message editor 53. The sending message editor 53 queries the UNI identification information 63 and retrieves the UNI-b between Terminal B and the ATM switch. Then, it reads out basic editing control data 621b corresponding to Terminal B UNI-b, and edits the sending message. At this time, when Terminal A UNI-a differs from Terminal B UNI-b, errors can occur during editing. When these kinds of editing errors are detected, the interworking controller 55 is activated, and performs the following control based on interworking control data 623.

Figure 2:
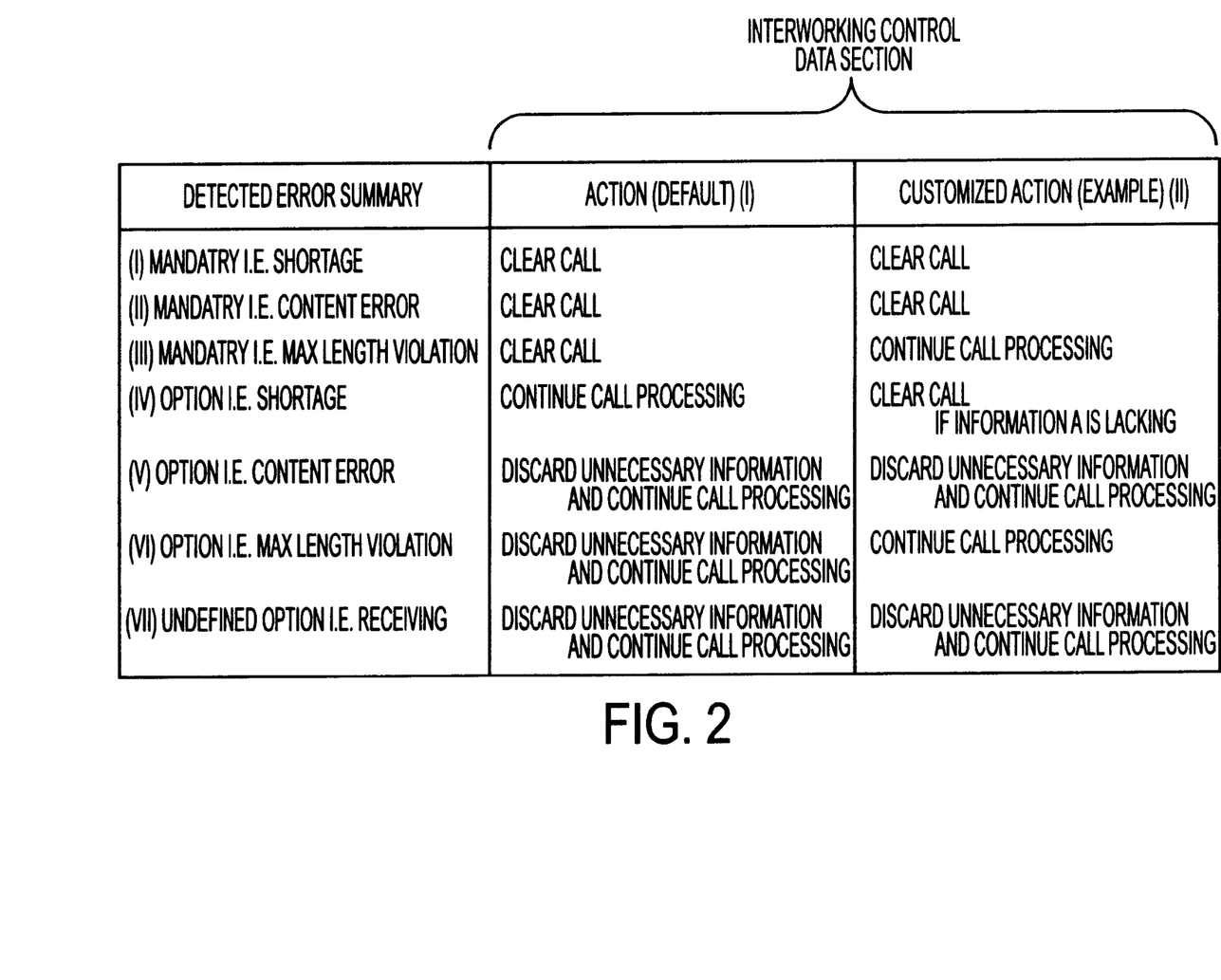
FIG. 2 is a example of interworking control data.

FIG. 2 provides an example of interworking control data 623. According to FIG. 2, in the case of Detected Error Summary (i) "mandatory i.e. shortage, that is, when an information element required during the editing of an sending message to User B (mandatory i.e.) is not included in an receiving message from User A, the call processing action for that is "Clear Call." Therefore, the interworking controller 55 clears this call processing. Furthermore, in the case of a Detected Error Summary (ii) "mandatory i.e. content error," that is, when an error exists in the contents of the above-cited mandatory information element, and for Detected Error Summary (iii) Mandatory i.e. max length violation," that is, when the length of the mandatory information element is longer than that stipulated by User B UNI-b, the call is cleared by the interworking controller 55.

Furthermore, in the example of interworking control data 623 provided in FIG. 2, in the case of Detected Error Summary (iv) "option i.e. shortage," that is, when a shortage of optional information elements is detected, call processing is continued. That is, there is a possibility that some network functions will be restricted, but the interworking controller 55 transmits the edited sending message to Terminal B.

In the past, when receiving message errors were detected, the sending message editor 53 indiscriminately cleared the call without editing the sending message. However, from the standpoint of realizing a broad network, it is desirable to continue call processing when an information element error which does not pose an obstacle to a connection between differing UNI is detected.

Therefore, interworking control data 623 is furnished with data which, in effect, continues call processing when, even though there is the possibility that certain network functions will be restricted, it is judged that these restrictions do not pose obstacles to the establishment of a connection between users with differing UNI.

Furthermore, in the case of a Detected Error Summary (v) "option i.e. content error," that is, when the contents of the above-cited optional information element are in error, and for Detected Error Summary (iv) "option i.e. max length violation," that is, when the length of an optional information element is longer than that stipulated by the User B UNI, the interworking controller 55 discards the pertinent information element and continues processing the call.

Further, in the case of Detected Error Summary (vii) "undefined i.e. receiving," that is, when an information element that is not defined in the Terminal B UNI is detected, the interworking controller 55 discards that information and continues processing the call.

The contents of the actions in this interworking Control data 623 can be individually customized. In the case of the max length violations of the above-cited mandatory information element (mandatory i.e.) and optional information element (option i.e.) in Detected Error Summaries (iii) and (vi) depicted in FIG. 2, the corresponding default action (I) is "Clear Call," but the a customized action (II) is "Continue Call Processing." That is, the interworking controller 55 transmits the edited sending message to Terminal B.

Further, for Detected Error Summary (iv), the customized action (II) can use control data that clears the call only when a certain specific optional information element A is lacking.

Further, the contents of interworking control data 623 are not limited to the examples given in FIG. 2. These data contents can be customized in accordance with the contents of UNI protocols for each terminal.

Figure 3:
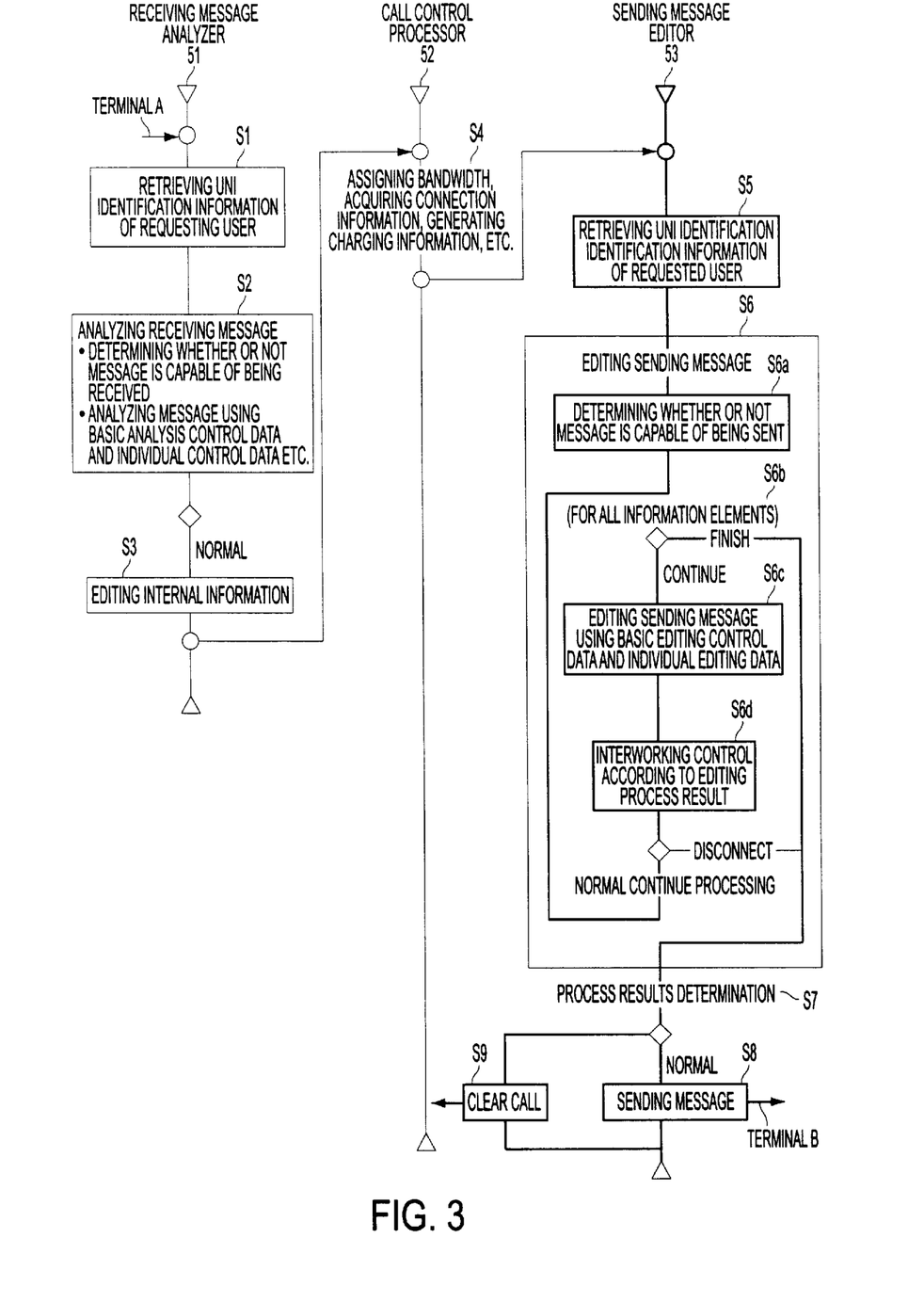
FIG. 3 is a flowchart depicting the communication sequence of an embodiment of the present invention.

FIG. 3 is a flowchart depicting the communications sequence of an embodiment of the present invention. According to FIG. 3, when a message is received from User A, the receiving message analyzer 51 retrieves the UNI-a of the connection setup requester (in this case User A) using UNI identification information 63 (S1). Then, it selects analysis control data 61 corresponding to this retrieved User A UNI, and based on this data, performs analysis processing, such as determining whether or not the message is capable of being received, and translating the message (S2).

If analysis results are normal, the receiving message is edited by internal information within the ATM switch (S3), and sent to the call control processor 52.

The call control processor 52 assigns virtual path (VP) and virtual channel (VC) bandwidth, acquires connection information and generates charging information (S4).

Next, the sending message editor 53 retrieves the UNI-b of the user of whom connection establishment was requested (in this case, User B) using UNI identification information similar to the manner described above (S5). Then, it edits the sending information based on editing control data 62 corresponding to the retrieved User B UNI-b (S6). That is, first, the sending message editor 53 determines whether or not the internal information sent from the call control processor 52 is a message capable of being transmitted to User B UNI (S6a). This processing is implemented for all information elements contained in the internal information (S6b).

More specifically, the sending message editor 53 reads out the basic editing control data 621 and individual editing data 622 provided by each recommendation organization, and edits a sending message for each information element in the internal information (S6c).

When, as a result of this editing process, editing error are detected, interworking control data 623 is read out, and the interworking controller 55 performs interworking control based on this data 623 (S6d). If the interworking controller 55 cannot perform interworking control normally without the data corresponding to the above-cited error, since it is not possible to establish a connection to User B, the interworking controller 55 cancels the connection setup request call. That is, in its process results determination (S7), it judges that an abnormality exists, and transmits a clear call notice to the call control processor 12 (52) (S9).

Message editing is performed for all information elements, and when judged to be normal, the message is sent to Terminal B (S8).

When an editing error is detected while an information element is being edited in the sending message editor 53 like this, interworking control data 623, which stipulates an action in accordance with the contents of this error, is prescribed, and an interworking controller 55, which performs call control according to this data 623, is established. This enables a network to be constructed among users with differing UNI.

Figure 4:
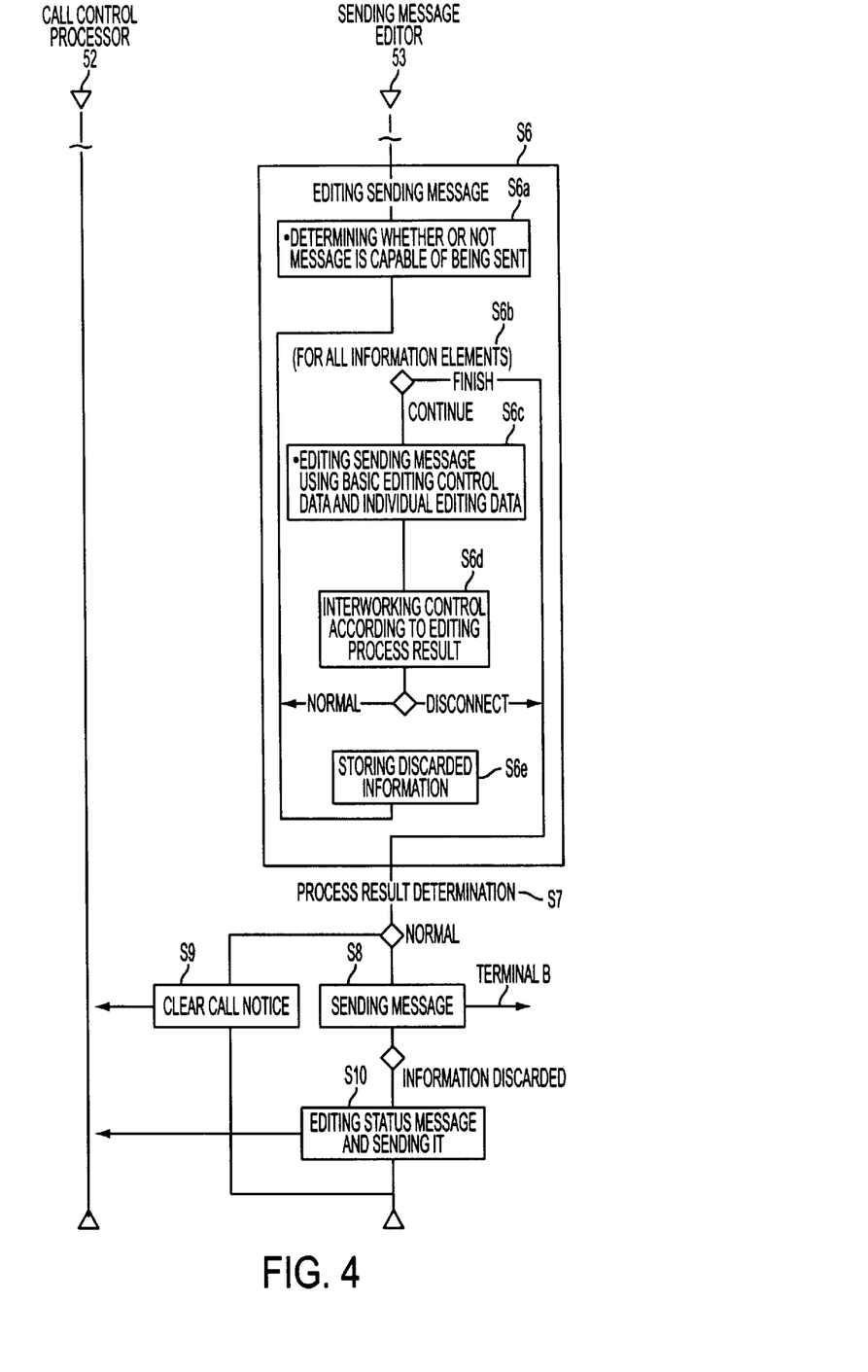
FIG. 4 is a communication sequence for a second embodiment of the present invention.

FIG. 4 depicts a communications sequence for a second embodiment of the present invention. For this embodiment, steps 1 (S1) through S6d are the same as in the first embodiment described above, but when an information element is discarded in the above-described interworking control, this embodiment stores this information element once in memory (S6e). Then, even when message editing is normal and the message is sent to Terminal B, the ATM switch is equipped with a function that transmits this discarded information element to User A.

Even if a message from User A is sent to User B, and a connection (that is, a VC) is established between User A and User B, when a required information element is discarded as a result of interworking control, there are cases where this restricts the communications environment. Therefore, this discarded information element is transmitted to User A as a status (STATUS) message (S10). This enables User A to know the connection setup status.

Figure 5:
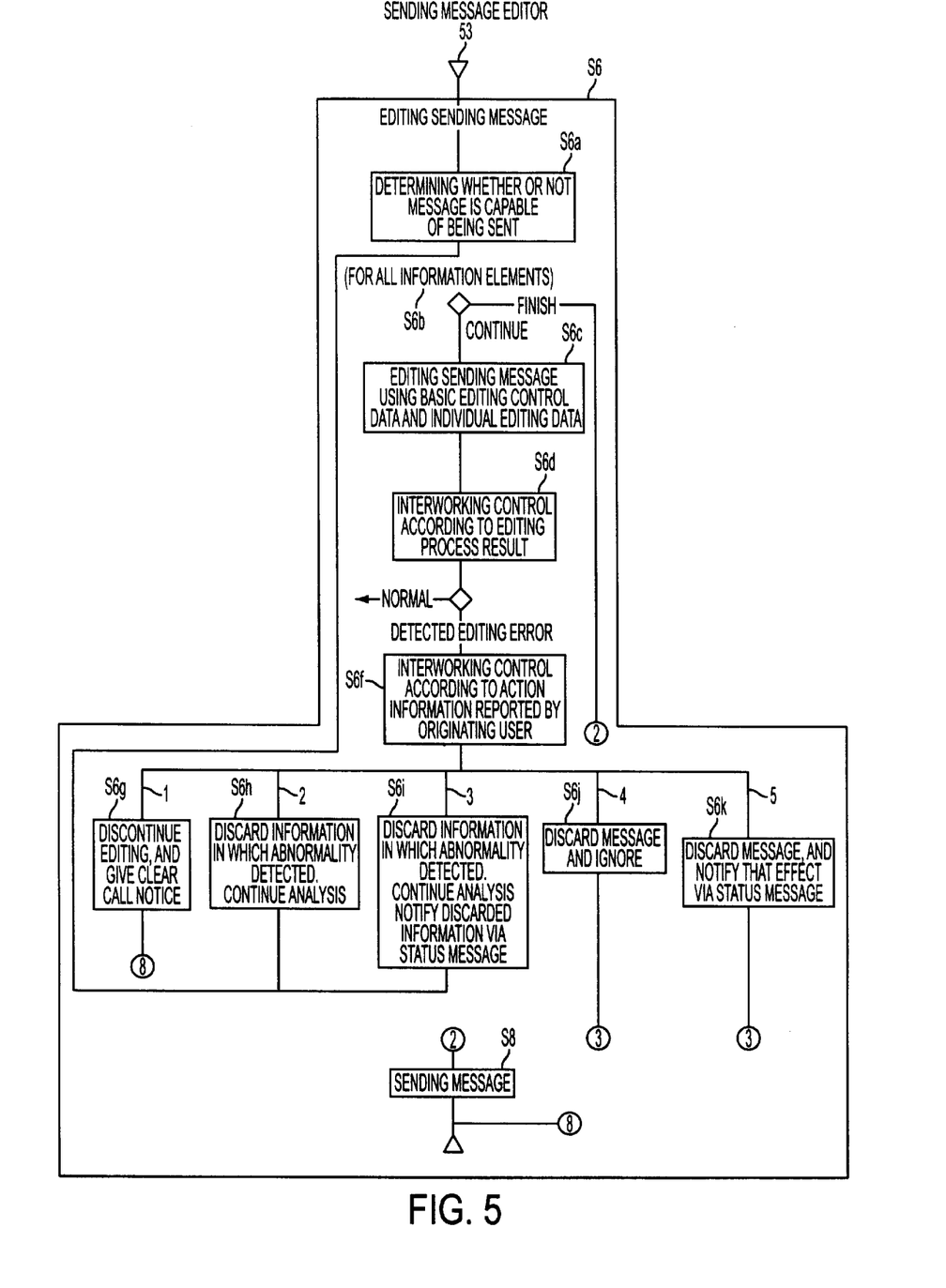
FIG. 5 is a communication sequence for a third embodiment of the present invention.

FIG. 5 depicts a communications sequence for a third embodiment of the present invention. For this embodiment as well, steps S1 through S6d are the same as in the first embodiment described above. Then, in this embodiment of the present invention, the control contents of interworking control are included in a message from User A. That is, the action information of interworking control performed when an editing error is detected during editing in the sending message editor 53 is included in the message from User A. Then, interworking control is performed in the sending message editor 53 on the basis of this action information reported by the originating user (S6f).

Some specific examples of originator declared action information are "Discontinue editing, and give clear call notice" (S6g), "Discard information in which abnormality detected, and continue analysis" (S6h), "Discard information in which abnormality detected, and continue analysis. Also, notify User A of discarded information via a STATUS message" (S6i), "Discard message and ignore" (S6j) and "Discard message, and notify User A to that effect via a STATUS message" (S6k).

Figure 6A:
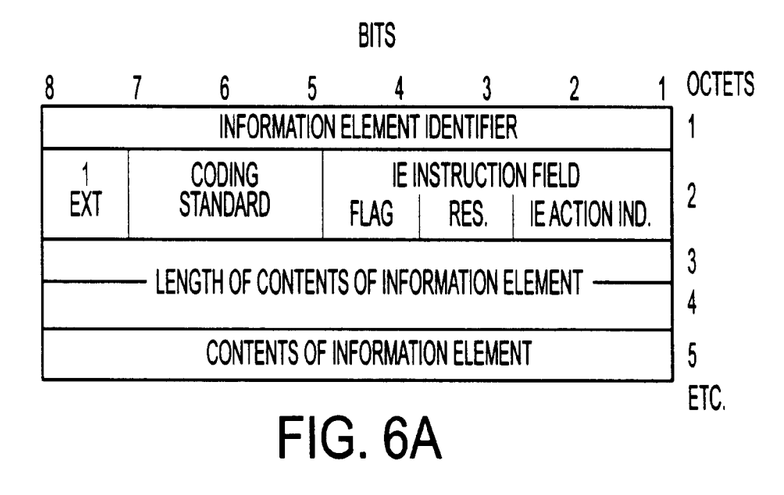
FIG. 6A is example of the format of a message into which the originator action information is written.
Figure 6B:
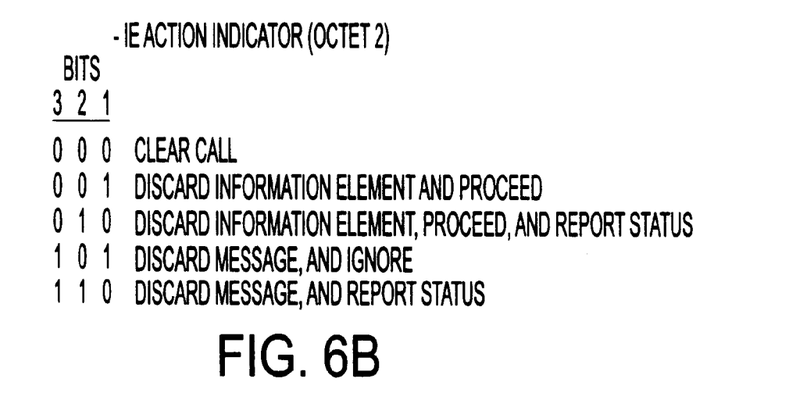
FIG. 6B is example of the contents of the originator declared action information corresponding to bit strings in the IE Action Indicator.

FIG. 6(a) depicts an example of the format of a message into which this kind of originator action information is written. According to FIG. 6, an octets (octet) 1 is an information element identifier region that identifies information elements. Then, the above-described originator declared action information is written into the IE Action Indicator region of the IE Instruction Field in octet 2. FIG. 6(b) depicts an example of the contents of originator declared action information corresponding to bit strings in the above-described IE Action Indicator. According to FIG. 6, bit string "000" corresponds to S6g, bit string "001" corresponds to S6h, bit string "010" corresponds to S6i, bit string "101" corresponds to S6j and bit string "110" corresponds to S6k, respectively, in the above-described FIG. 5.

Since the contents of the other octets in FIG. 6(a) are not related to this embodiment, explanations of these contents are omitted.

Figure 7:
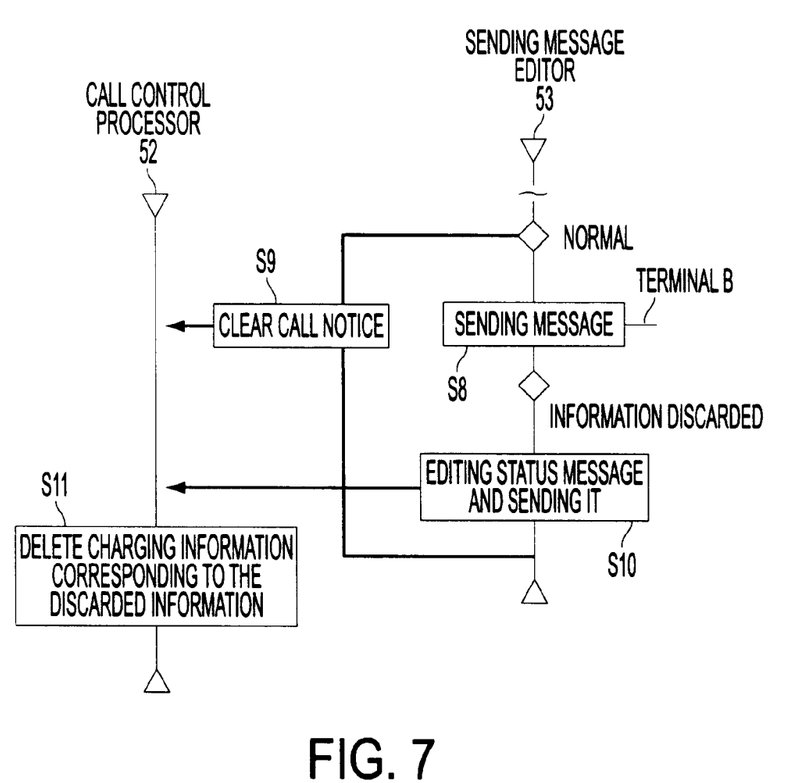
FIG. 7 is a communication sequence for a forth embodiment of the present invention.

FIG. 7 depicts a communications sequence for a fourth embodiment of the present invention. By virtue of this embodiment, while notifying User A of discarded information via a STATUS message in the above-described second embodiment, charging information already generated by the call control processor 52 is read out, and corrections which delete charging information corresponding to the information to be notified are performed (S11).

Figure 8:
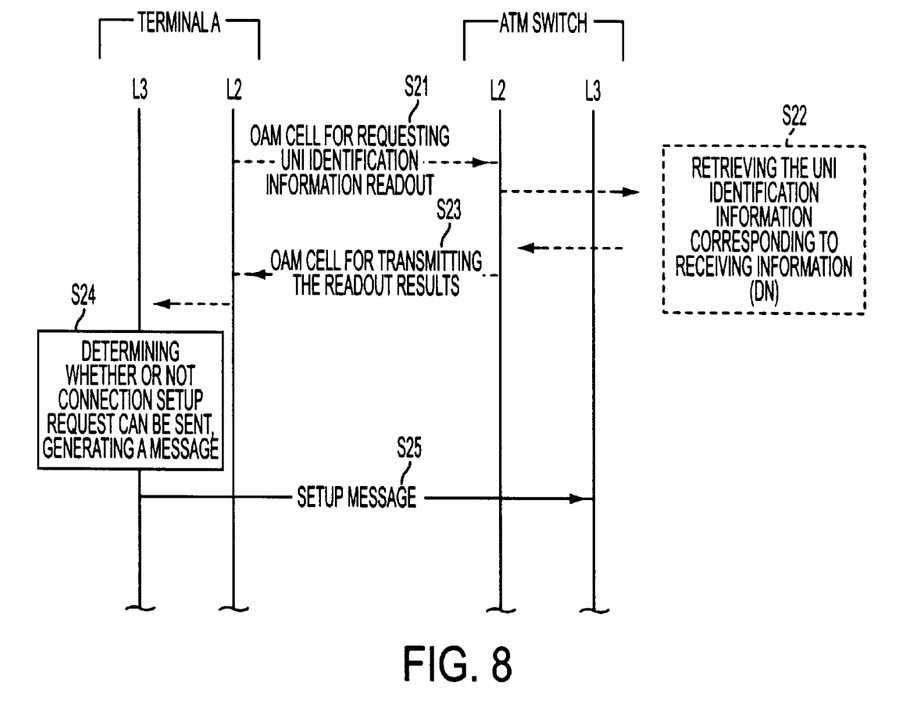
FIG. 8 is a communication sequence for a fifth embodiment of the present invention.

FIG. 8 depicts a communications sequence for a fifth embodiment of the present invention. By virtue of this embodiment, prior to the transmission of a call setup message to request the establishment of a connection, the user acquires via the use of an operation, administration and maintenance (OAM) cell UNI identification information held by an ATM switch.

More specifically, prior to User A sending a connection setup request message to User B, for example, Terminal A sends to an ATM switch 10 an OAM cell for requesting UNI identification information readout to obtain Terminal B UNI-b information (S21). This OAM cell is not sent via the message transmission layer L3 at this time, but rather is transmitted via layer L2, which manages the signaling link.

An ATM switch comprises a device that terminates the signaling link (BSGC) (not diagrammed), and this BSGC receives this OAM cell. The BSGC further determines the "OAM CELL FUNCTION TYPE" inside the OAM cell, and as a result, when the received OAM cell is a UNI identification information readout OAM cell, transmits the information inside this OAM cell to the controller 50.

The controller 50 retrieves UNI identification information corresponding to User B UNI-b from the UNI identification information 63 inside memory 60 (S22), and transmits these results to the above-described BSGC. Then, the BSGC generates an OAM cell for transmitting the readout results containing this information, and returns this OAM cell to User A's terminal (S23).

Then, based on the UNI identification information included in this OAM cell for transmitting readout results, User A's terminal determines whether or not a connection setup request can be sent to User B. if it can be sent, User A's terminal generates a message in accordance with User B UNI identification information (S24). After that, it sends out the generated connection setup request message (SETUP message) (S25).

By obtaining in advance the UNI identification information of the party with whom a connection is to be set up, prior to performing call processing like this, it is possible to avoid unnecessary charges and network congestion brought on by the transmission of a useless message (call processing control signal) in a situation wherein the establishment of a connection is not possible.

Further, to determine whether or not the received OAM cell is an OAM cell for reading out UNI identification information, a previously decided bit string for the above-described "OAM CELL FUNCTION TYPE," in which this information is written, is stored in this BSGC.

Figure 9:
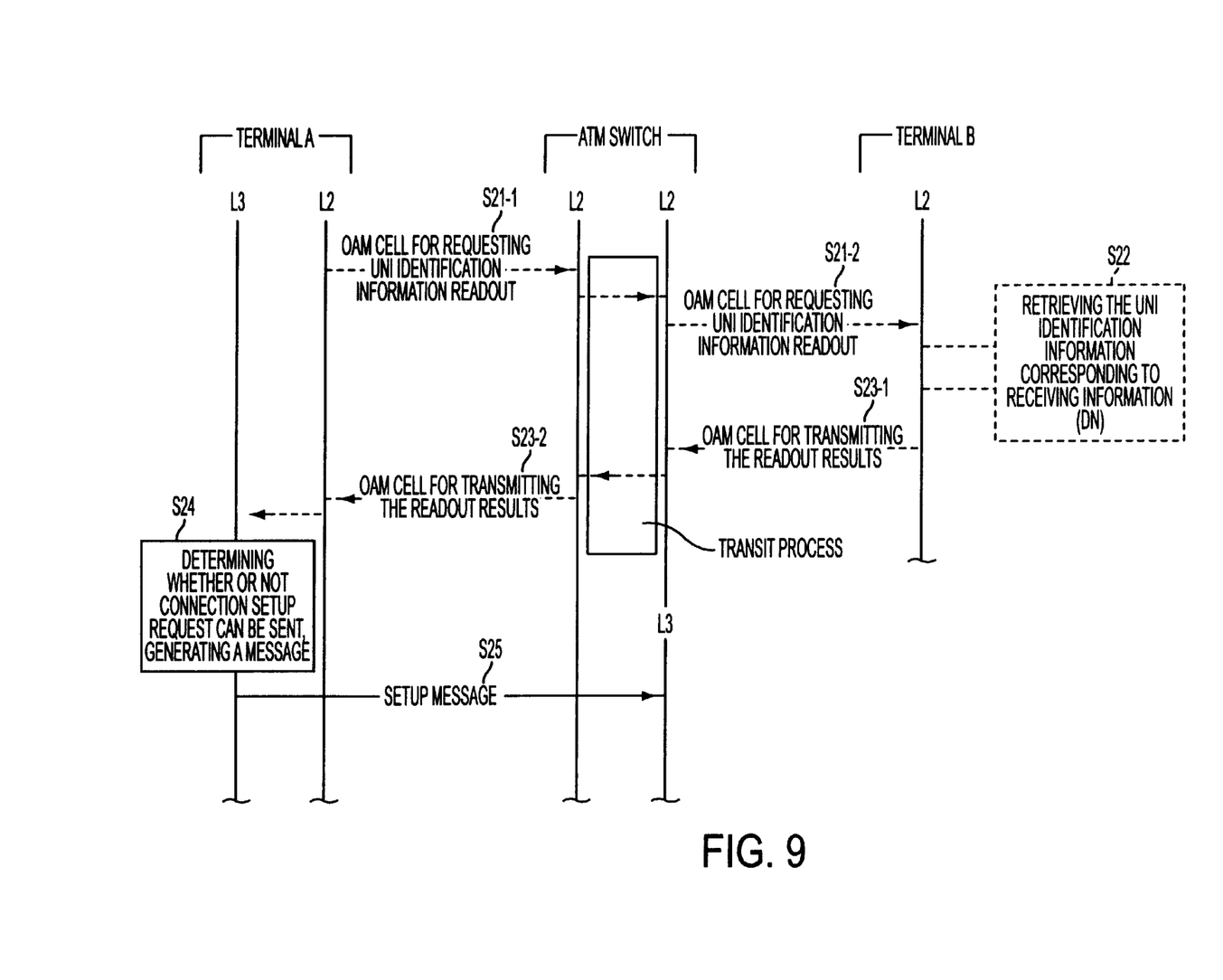
FIG. 9 is a communication sequence for a sixth embodiment of the present invention.

FIG. 9 depicts a communications sequence for a sixth embodiment of the present invention. With this embodiment, the UNI identification information of User B, the party with whom the connection setup performed in the above-described fifth embodiment is scheduled to be made, is obtained directly from User B rather than from the ATM switch.

More specifically, an OAM cell for UNI identification information readout is sent from User A via (through) an ATM switch to the above-described BSGC (not diagrammed), which terminates the signaling link of the User B terminal (S21-1, S21-2). This BSGC has the UNI identification information of User B, and when it receives this OAM cell, it reads out this UNI identification information (S22). Then, the BSGC corresponding to terminal B generates an OAM cell for transmitting the readout results that contain this information, and returns this OAM cell via (through) the ATM switch to the terminal of user A (S23-1, S23-2).

Then, similar to the above-described fifth embodiment, based on the UNI identification information included in this OAM cell for transmitting readout results, the User A terminal either determines whether or not a connection setup request can be sent to User B, or generates a message in accordance with User B UNI identification information (S24). After that, it transmits the generated connection setup request message (SETUP message) (S25). By querying User B directly instead of the ATM switch about this UNI identification information like this, it is possible to obtain more accurate UNI identification information.

As explained above, the OAM cell in the fifth and sixth embodiments of the present invention is processed by layer L2, the signaling link control layer, which is located under layer L3, which controls the above-described call processing control signal (message) in an ATM network. Therefore, UNI identification information can be obtained at high speed, and at no charge, prior to transmitting a message, making it possible to avoid the congestion of an ATM network as a result of a surplus of messages being transmitted via layer L3.

As explained above, by virtue of the ATM switch of the present invention, a plurality of UNI are identified using UNI identification information, and it is possible to establish a connection between users with differing UNI by adhering to analysis data and editing control data, which correspond to retrieved UNI.

Connections between differing UNI also become possible by providing an interworking controller and interworking control data, which implement controls when an error brought on by differences in UNI is detected in message editing.

It is also possible to learn a receiving party's UNI prior to transmitting a message by using an OAM cell to retrieve the above-described UNI identification information. Then, by generated a message which corresponds to that UNI, it becomes possible to avoid an abnormal call, failure and congestion in the network.

What is claimed is:

1. An asynchronous transfer mode switch for switching signals sent from/to terminals, comprising:
    memory for storing identification information which identifies user-network interfaces with said terminals, analysis control data for analyzing a call control signal for each user-network interface, and editing control data for editing a call control signal for each user-network interface;
    analysis means for analyzing a first call control signal in accordance with said analysis control data corresponding to a first user-network interface identified on the basis of said identification information when said first call control signal is received from a first terminal for setup with a second terminal;
    call control means for performing call control based on said first call control signal analyzed by said analysis means; and
    editing means for editing said first call control signal to a second call control signal in accordance with said editing control data corresponding to a second user-network interface identified on the basis of said identification information.

2. The asynchronous transfer mode switch according to claim 1, wherein said memory stores interworking control data for controlling call process when an error is detected while said second call control signal is being edited based on said editing control data; and further comprising interworking control means for controlling said call process based on said interworking control data when said error is detected.

3. The asynchronous transfer mode switch according to claim 2, wherein said first and second call control signals contain a plurality of information elements, and when an information element essential during editing of said second call control signal is not included in said first call control signal, said interworking control means perform call clear.

4. The asynchronous transfer mode switch according to claim 2, wherein said first and second call control signals contain a plurality of information elements, and when an information element optional during editing of said second call control signal is not included in said first call control signal, said interworking control means controls to continue to edit said second call control signal.

5. The asynchronous transfer mode switch according to claim 2, wherein said interworking control data can be customized.

6. The asynchronous transfer mode switch according to claim 2, wherein said first and second call control signals contain a plurality of information elements, and when a portion of the information elements of said first call control signal is discarded during editing of said second call control signal, a third call control signal, which contains the discarded information element, is sent to the first terminal.

7. The asynchronous transfer mode switch according to claim 1, wherein said first call control signal comprises control data for call process when an error is detected while said second call control signal is being edited based on said editing control data; and further comprising interworking control means for controlling said call process based on said control data when the error is detected.

8. The asynchronous transfer mode switch according to claim 6, wherein call control charging information is corrected on the basis of said third call control signal.

9. A method for switching signals sent from/to terminals in an asynchronous transfer mode switch, comprising the steps of:
    storing identification information which identifies user-network interfaces with said terminals, analysis control data for analyzing a call control signal for each user-network interface, and editing control data for editing a call control signal for each user-network interface;
    analyzing a first call control signal in accordance with said analysis control data corresponding to a first user-network interface identified on the basis of said identification information when said first call control signal is received from a first terminal for setup with a second terminal;
    performing call control based on said first call control signal which is analyzed; and
    editing said first call control signal to a second call control signal in accordance with said editing control data corresponding to a second user-network interface identified on the basis of said identification information.

10. The method according to claim 9, wherein said storing step further stores interworking control data for controlling call process when an error is detected while said second call control signal is being edited based on said editing control data; and further comprising the step of:
    interworking controlling said call process based on said interworking control data when said error is detected.

11. The method according to claim 10, wherein said first and second call control signals contain a plurality of information elements, and when an information element essential during editing of said second call control signal is not included in said first call control signal, said interworking controlling step performs call clear.

12. The method according to claim 10, wherein said first and second call control signals contain a plurality of information elements, and when an information element optional during editing of said second call control signal is not included in said first call control signal, said interworking controlling step controls to continue to edit said second call control signal.

13. The method according to claim 10, wherein said interworking control data can be customized.

14. The method according to claim 10, wherein said first and second call control signals contain a plurality of information elements, and when a portion of the information elements of said first call control signal is discarded during editing of said second call control signal, a third call control signal, which contains the discarded information element, is sent to said first terminal.

15. The method according to claim 9, wherein said first call control signal comprises control data for call process when an error is detected while said second call control signal is being edited based on said editing control data; and further comprising the step of:

interworking controlling said call process based on said control data when the error is detected.

16. The method according to claim 14, wherein call control charging information is corrected on the basis of said third call control signal.

17. A method for connecting between a first terminal and a second terminal which are connected to an asynchronous transfer mode switch, which stores user-network interface identification information which identifies user-network interface between said asynchronous transfer mode switch and said first and second terminals, said method comprising the steps of:

sending a first OAM cell for requesting user-network interface identification information between said asynchronous transfer mode switch and said second terminal from said first terminal to said asynchronous transfer mode switch prior to connection setup;

sending a second OAM cell having user-network interface identification information of user-network interface between said asynchronous transfer mode switch and said second terminal from said asynchronous transfer mode switch to said first terminal; and determining on the basis of said identification information whether or not a connection can be established with said second terminal in said first terminal.

18. A method for connecting between a first terminal and a second terminal which are connected to an asynchronous transfer mode switch, said first and second terminal stores user-network interface identification information between said asynchronous transfer mode switch and said first and second terminals respectively, said method comprising the steps of:

sending a first OAM cell for requesting user-network interface identification information between said asynchronous transfer mode switch and said second terminal from said first terminal to said second terminal via asynchronous transfer mode switch prior to connection setup;

sending a second OAM cell having user-network interface identification information of user-network interface between said asynchronous transfer mode switch and said second terminal from said second terminal to said first terminal; and determining on the basis of said identification information whether or not a connection can be established with said second terminal in said first terminal.

19. The method according to claim 17, wherein when a connection setup with said second terminal is determined to be possible, said first terminal generates a call control signal corresponding to the user-network interface of said second terminal, and initiates a call setup request.

20. The method according to claim 18, wherein when a connection setup with said second terminal is determined to be possible, said first terminal generates a call control signal corresponding to the user-network interface of said second terminal, and initiates a call setup request.

* * * * *